(12) United States Patent
Lingelbach

(10) Patent No.: US 11,353,197 B2
(45) Date of Patent: Jun. 7, 2022

(54) POLE MOUNTED DEVICE AND METHOD FOR HANGING DECORATIVE LIGHTS

(71) Applicant: Mark F. Lingelbach, Fishers, IN (US)

(72) Inventor: Mark F. Lingelbach, Fishers, IN (US)

(73) Assignee: Moonlight Concepts LLC, Fishers, IN (US)

( * ) Notice: Subject to any disclaimer, the term of this patent is extended or adjusted under 35 U.S.C. 154(b) by 365 days.

(21) Appl. No.: 16/787,481

(22) Filed: Feb. 11, 2020

(65) Prior Publication Data
US 2020/0284409 A1    Sep. 10, 2020

Related U.S. Application Data

(60) Provisional application No. 62/804,182, filed on Feb. 11, 2019.

(51) Int. Cl.
| | |
|---|---|
| *B25J 1/00* | (2006.01) |
| *F21V 21/08* | (2006.01) |
| *F16B 45/00* | (2006.01) |
| *F21S 4/10* | (2016.01) |
| *F21V 21/36* | (2006.01) |
| *B25F 1/02* | (2006.01) |
| *B25J 1/04* | (2006.01) |
| *B25J 1/02* | (2006.01) |

(52) U.S. Cl.
CPC ............. *F21V 21/08* (2013.01); *B25F 1/02* (2013.01); *B25J 1/02* (2013.01); *B25J 1/04* (2013.01); *F16B 45/00* (2013.01); *F21S 4/10* (2016.01); *F21V 21/36* (2013.01)

(58) Field of Classification Search
CPC ... F21V 21/08; F16B 45/00; F21S 4/10; F21S 4/001; B25J 1/02; B25J 1/04
USPC .......................................... 294/209, 210, 211
See application file for complete search history.

(56) References Cited

U.S. PATENT DOCUMENTS

| | | | | |
|---|---|---|---|---|
| 1,684,529 A | * | 9/1928 | Basmadjian | ............... B25J 1/04 294/22 |
| 2,505,113 A | * | 4/1950 | Handley | ................... F23J 3/02 294/9 |
| 2,724,569 A | * | 11/1955 | Licata | ................... A01K 97/10 403/53 |

(Continued)

OTHER PUBLICATIONS

Bright Ideas Party Lights http://brightideas.partylights.com/2016/09/01/christmas-led-string-lights-guide/ Sep. 1, 2016.

*Primary Examiner* — Paul T Chin
(74) *Attorney, Agent, or Firm* — Indiano Law Group LLC; E. Victor Indiano

(57) ABSTRACT

A string hanging device for hanging a continuous ornamental string on a physical object having a portion elevated above the upward reach of a user, is disclosed. The string hanging device includes a tubular member having an arcuately curved interior passageway configured for receiving the ornamental string. The passageway includes an entry port and an exit port. A pole member is included that has a proximal end and a distal end, and a coupler portion disposed at the distal end. A coupler is provided for removably coupling the tubular member to the coupler portion of the distal end of the pole. A hook member includes a coupler for removably coupling the hook member to the coupler portion of the distal end of the pole.

19 Claims, 6 Drawing Sheets

(56) References Cited

U.S. PATENT DOCUMENTS

| | | | | |
|---|---|---|---|---|
| 4,004,834 | A * | 1/1977 | Podpaly | B25B 9/00 |
| | | | | 294/210 |
| 6,425,614 | B1 * | 7/2002 | Limber | B25B 9/00 |
| | | | | 248/219.2 |
| 7,429,067 | B1 * | 9/2008 | Rosa | F21S 4/10 |
| | | | | 248/303 |
| 8,459,712 | B2 * | 6/2013 | Thrasher | B25B 31/00 |
| | | | | 248/219.2 |
| 9,056,393 | B1 * | 6/2015 | Gary | F21S 4/10 |
| 9,999,970 | B2 * | 6/2018 | Browning | B25G 1/10 |
| 10,851,818 | B2 * | 12/2020 | Chi Man | G09F 7/18 |
| 2013/0333197 | A1 * | 12/2013 | Schulte | F16M 13/02 |
| | | | | 29/525.08 |

* cited by examiner

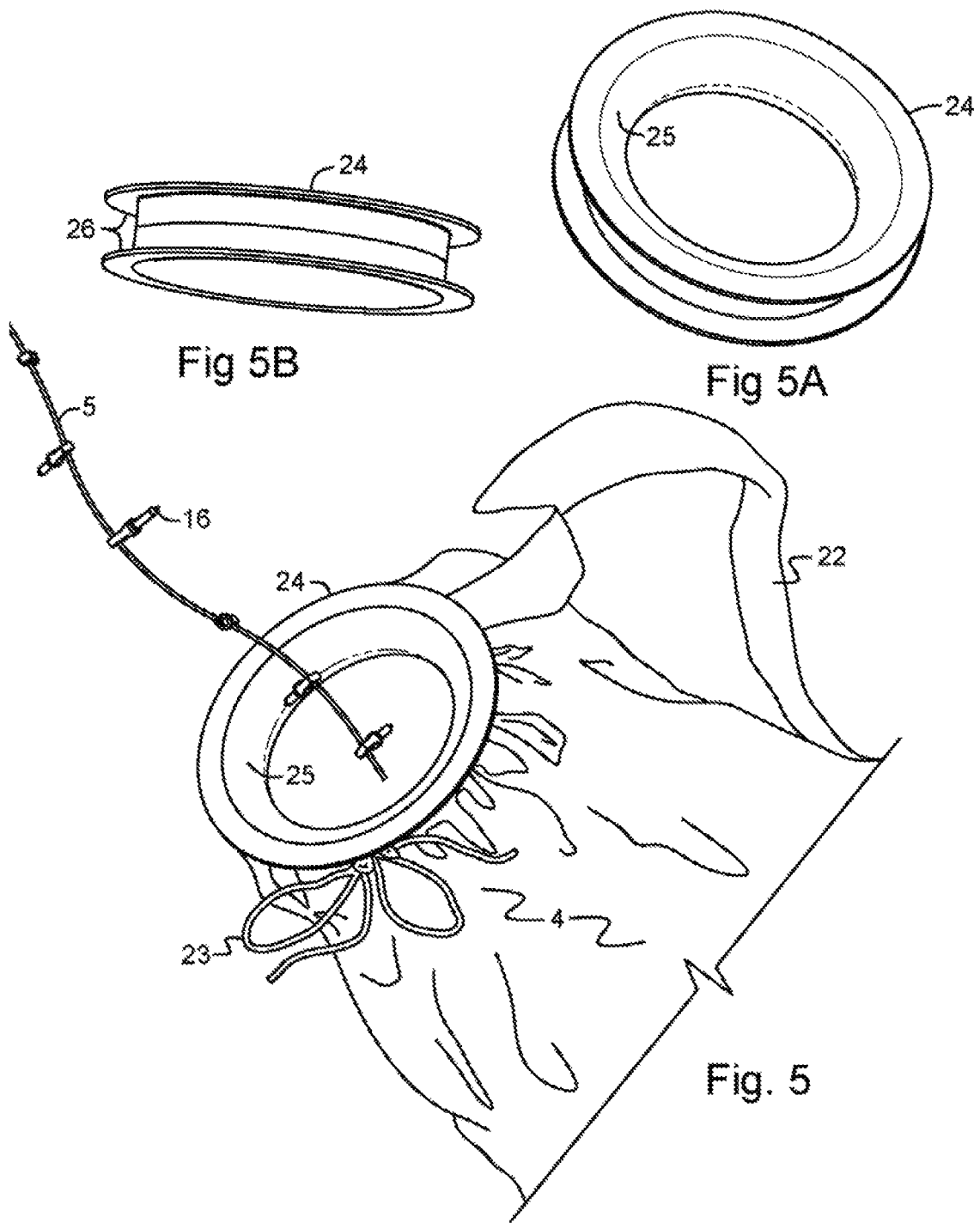

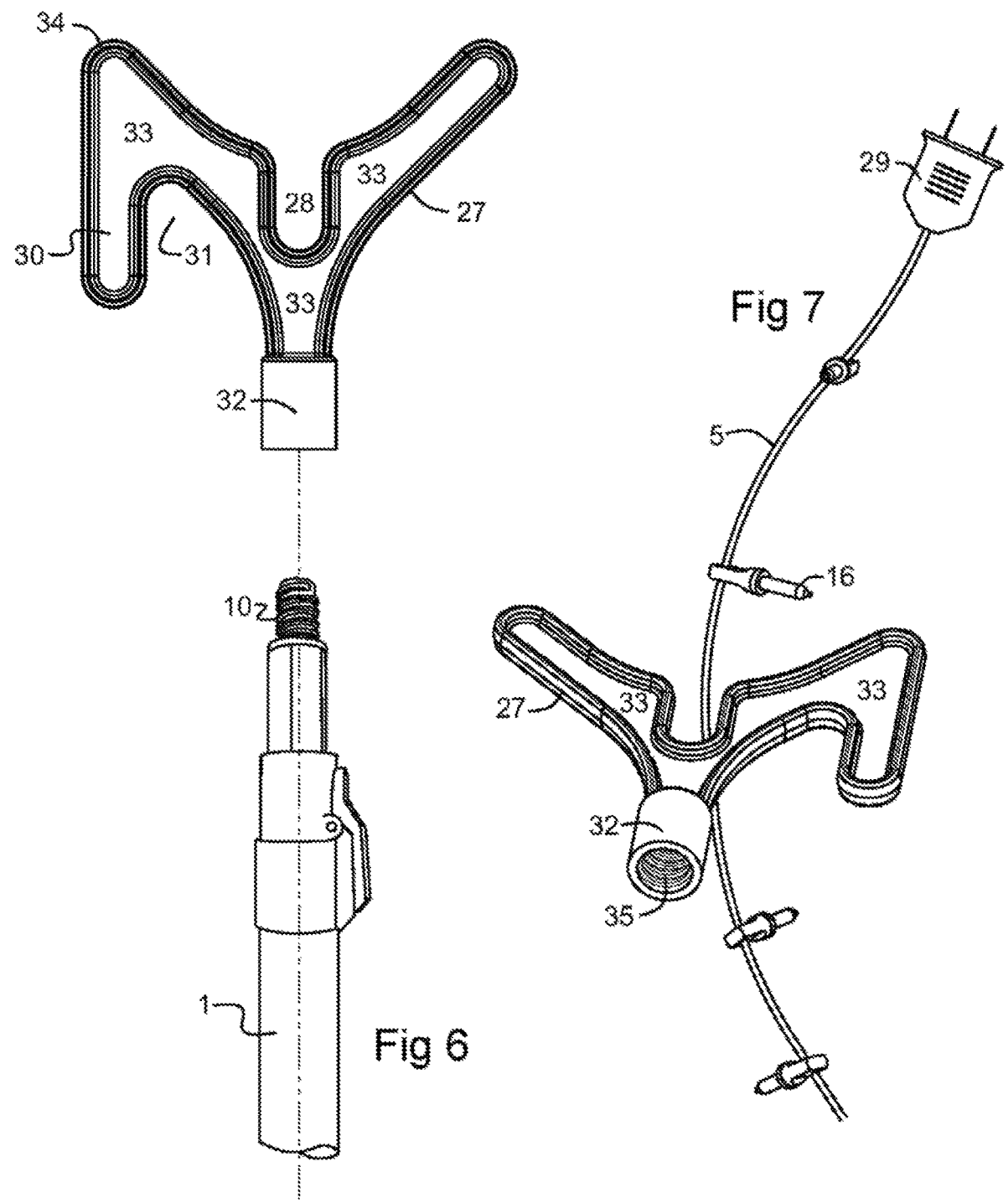

POLE MOUNTED DEVICE AND METHOD FOR HANGING DECORATIVE LIGHTS

REFERENCE TO RELATED APPLICATIONS

This application claims the benefit of Mark F. Lingelbach U.S. Provisional Patent Application No. 62/804,182 filed on Feb. 11, 2019, which is fully incorporated herein by reference.

I. TECHNICAL FIELD OF THE INVENTION

The present invention generally relates to devices and a method for the hanging or placement of a continuous string of ornamental lights or other ornamental strings on a tree or other physical structure. More specifically, the invention pertains to a device mounted on an extendable pole to guide the lights for hanging and a convenient device for dispensing the lights or other ornamental string.

II. BACKGROUND OF THE INVENTION

It is common to decorate trees and other structures such as poles, displays, houses, and other building structures with continuous strings of ornamental lights or other ornamental strings to celebrate a holiday or special occasion. Examples of such ornamental light strings can be found a Bright Ideas Party Lights http://brightideas.partylights.com/2016/09/01/christmas-led-string-lights-guide/, 1 Sep. 2016, which is incorporated herein by reference.

Christmas is possibly the most widely celebrated holiday where decorating in this fashion occurs. However, Halloween, St Patrick's Day, Easter and Independence Day are holidays where this form of decorating is rapidly increasing in popularity. Weddings, corporate parties and similar large events are also occasions where you will find lighted trees. Commonly decorated trees include evergreen, deciduous and palm trees of reasonable height and canopy size. Although this form of decorating is highly sought after, there are inherent difficulties with the current installation means and methods. One source of the difficulty is that such structures often include portions that are above the extent of the practical upward reach of the user.

Lights and ornamental strings are generally placed or suspended on the tree's branches in a continuous spiral pattern around the circumference of the tree extending from the top of the tree down to its base or trunk. Palm trees, on the other hand, are often decorated by wrapping the entire trunk from the base of the fronds to the ground.

The trees most commonly selected for decorating tend to be taller making it very difficult for the installer to hang the lights or string single-handed. A ladder or other means to reach the top of the tree or structure is usually required, thereby exposing the installer to the possibility of falling. Inclement weather conditions, climbing up and down repetitively, and insecure footing on the ladder on uneven or unstable ground increase this risk.

To compound the challenges encountered while attempting to reach the higher heights, light strings inevitably become tangled and easily catch on other objects such branches, shoes, clothing and ladder rungs. This makes it extremely difficult for an installer to manage without the help of an additional person or persons, especially while climbing a ladder.

Present-day means and methods are labor intensive, have potential for personal injury, and are tremendously time consuming. When you consider the time spent working out the tangles; constantly moving a ladder; climbing up and down; and stretching to reach branches, one can easily spend hours to decorating a few trees. For people residing in northern climates, the less time spent outdoors decorating for the winter holiday season, the better.

Another drawback encountered with conventional methods is the removal of the lights or ornamental strings. Light strings have a tendency to become tangled in the branches of a tree after long exposure to wind and the elements. They are commonly removed from a standing position on the ground by pulling down and away from the branches.

As previously noted, light strings easily catch on objects, and become stuck in the tree branches. Exerting more force to free the light string from the branch only results in damage to the lights, the tree or both. If done while standing on a ladder to achieve a better angle to release the string from the branches, the risk of fall becomes greater.

These difficulties demonstrate the need for an innovative method accompanied by clever devices that can improve the chore of decorating trees and other physical objects with a continuous string of lights or other ornamental strings. There is not only a need to make the installation process more efficient in terms of time and effort spent, but more importantly, a need to make the process safer for the installer.

III. BRIEF SUMMARY OF THE INVENTION

In accordance with the present invention a string hanging device for hanging a continuous ornamental string on a physical object having a portion elevated above the upward reach of a user, is provided. The string hanging device comprises a tubular member having an arcuately curved interior passageway configured for receiving the ornamental string. The passageway includes an entry port and an exit port. A pole member is included that has a proximal end and a distal end, and a coupler portion disposed at the distal end. A coupler is provided for removably coupling the tubular member to the coupler portion of the distal end of the pole. A hook member includes a coupler for removably coupling the hook member to the coupler portion of the distal end of the pole.

The present invention relates to devices and a method for the installation of a continuous ornamental such as a string of lights (hereinafter "light string") on trees or other physical objects. This is accomplished without the use of a ladder or similar means to reach reasonable heights.

In a preferred embodiment of the current invention there is a device for hanging or suspending the light string on the tree. This device comprises a lightweight tubular member having an arcuate bend which may be a ninety (90) degree bend. The device also includes a connector for connecting the tubular member to an extension pole. A guide ring with a clamp member and attachment knob may also be provided for coupling to the extension pole at the end of the outermost section and for alignment with an entry port. The tubular member includes an entry flange. The extension pole may comprise a dual or multi-section extendable pole.

In use, the light string pulls through the guide ring in a vertical direction and changes to a horizontal direction as it emerges through the exit port of the arcuate tubular device for placement on the tree branches.

In another preferred embodiment of the present invention, a device is provided for dispensing the light string. This device comprises a fabric bag that is preferably medium sized and made of canvas, nylon, or similar material. The bag may include a closure member such as a drawstring opening that ties or has other mechanism to cinch closed.

The bag may also include a shoulder strap, and an opening ring with a rounded inner face that is cinched in the opening of the bag by tightening the drawstring around it.

The continuous light string may include one or a plurality of connected light strings joined. The light strings are inserted into the bag through the ring at the opening and simply allowed to coil or lay naturally in the bottom of the bag. The lights are then pulled from the bag, suspended on the installers shoulder, as they pull through the pole mounted devices during the installation.

In yet another preferred embodiment of the present invention a device is provided for making fine adjustments to the light string once the string is placed or suspended on the tree or other structure. The adjustment device comprises a hook member, which preferably comprises a flat "Y" shaped adjustment hook with internal threads for attachment to the extension pole. The adjustment device hook also includes a center vertical slot for the light string to slide into that is narrow enough to prohibit the string from sliding in a horizontal direction or perpendicular to the object face, either past an individual light or end plug. A projection pointing downward from one side of the "Y" can be used for pulling the light string in a downward direction.

The combination of the "Y" shape and center slot allows the installer to easily grab the light string for positioning the string on a desired branch or making other fine adjustments.

The present invention further discloses a most preferred method of suspending a continuous ornamental string from the branches of tree or other physical structure. Preferably, the method includes the following steps: (a) attaching the tubular member to the end of the extension pole by threading its couplers onto the external threads of said pole; (b) attaching the guide ring assembly to the extension pole at the end of the first outermost section by tightening the threaded knob until the ring is securely affixed; (c) loading the continuous light string, starting with the female plug end, into the bag through the ringed opening, allowing the lights to coil or lay in the bottom of the bag naturally; and (d) taking the male plug end of the light string and pulling through the guide ring attached to the extension pole.

The method also includes the steps of: (e) continuing to pull the light string through the guide ring, insert and pull through the tubular object until there is enough length to reach a branch near eye level from the ground; (f) selecting a branch within reach, securing the male plug end of the light string by wrapping the string around the branch two or more times; (g) with the bag containing the continuous light string(s) placed on the users shoulder and the extension pole with attachments in-hand, moving away from the point of connection to the tree thereby allowing the lights to dispense from the bag, sliding through the guide ring and funnel; and (h) beginning to move perimetrally around the tree to thereby place or suspend the light string from branches at roughly the same elevation. The tubular attachment changes the direction of the light string from vertical to horizontal for easy placement on the branches;

The method further includes the steps of: (i) while approaching the starting point, beginning to raise and place the light string on higher branches until the desired height above the starting point or vertical separation between strings is achieved; (j) extending the pole as required to continue placing the light string on branches around the tree, while elevating the string to the desired separation distance on each rotation; (k) before approaching the top of the tree, disconnecting any additional light strings connected beyond the length necessary to reach the top or overall desired elevation and allow the string to pull through the funnel and dangle from the last branch; and (l) laying the extension pole on the ground to remove the guide ring and funnel attachments, and then installing the "Y" shaped hook object on the threaded end of the extension pole.

The next steps are: (m) extending the pole vertically toward the dangling end of the light string, and allowing the string to drop into the center slot at point near the plug end and pulling gently in a horizontal direction until the plug is secure against the vertical plane of the "Y" shaped hook attachment; (n) while continuing to hold gentle pressure on the string, choosing a branch to terminate the string and place the end of the light string over that branch.

For evergreen trees (and other trees having branches below eye level), additional lights may be added to extend from the starting point at eye level down to the trunk. Finally, (o) the "Y" shaped hook attachment should be used, make any fine adjustments to the light string by moving the string to desired branches; and then the string should be connected to a power source.

Removal of the lights after the holiday season or special occasion can be easily accomplished by performing similar steps as noted in the paragraph above. Beginning at the original starting point, one should disconnect the light string from the power source or other string and feed through the funnel and guide ring in the reverse direction. While gently pulling the light string downward, using the funnel attachment to lift the string off the branches, traverse around the tree in the reverse direction from the installation. The string can accumulate on the ground at the base of the tree for collection and storage upon completion of removal.

IV. BRIEF DESCRIPTION OF THE DRAWINGS

Some of the embodiments of the present invention will become more readily appreciated by reference to the detailed descriptions below when considered in connection with the accompanying drawings, wherein:

FIG. 5 is a perspective view of one example of the shoulder bag used to dispense the light string and the opening ring according to various embodiments described herein.

FIG. 5A is a perspective view of an opening ring used in conjunction with a dispending bag;

FIG. 5B is another perspective view of the opening right of FIG. 5A.

FIG. 6 is an exploded view of an exemplary "Y" shaped adjustment attachment and extension pole; and FIG. 7 is a perspective view of the "Y" shaped adjustment attachment in use with a string of lights according to various embodiments described herein and a fragmented view of a typical extension pole.

V. DETAILED DESCRIPTION OF THE PREFERRED EMBODIMENT

The terminology used herein is for the purpose of describing particular embodiments only and is not intended to limit the invention. As used herein, the term "and/or" includes any and all combinations of one or more of the associated listed items. As used herein, the singular forms "a," "an," and "the" are intended to include the plural forms as well as the singular forms, unless the context clearly indicated otherwise. It will be further understood that the terms "comprises" and/or "comprising" when used in this specification, specify the presence of stated features, steps, operations, elements, and/or components, but do not preclude the presence or addition of one or more other features, steps, operations, elements, components, and/or groups thereof.

Figure 1:
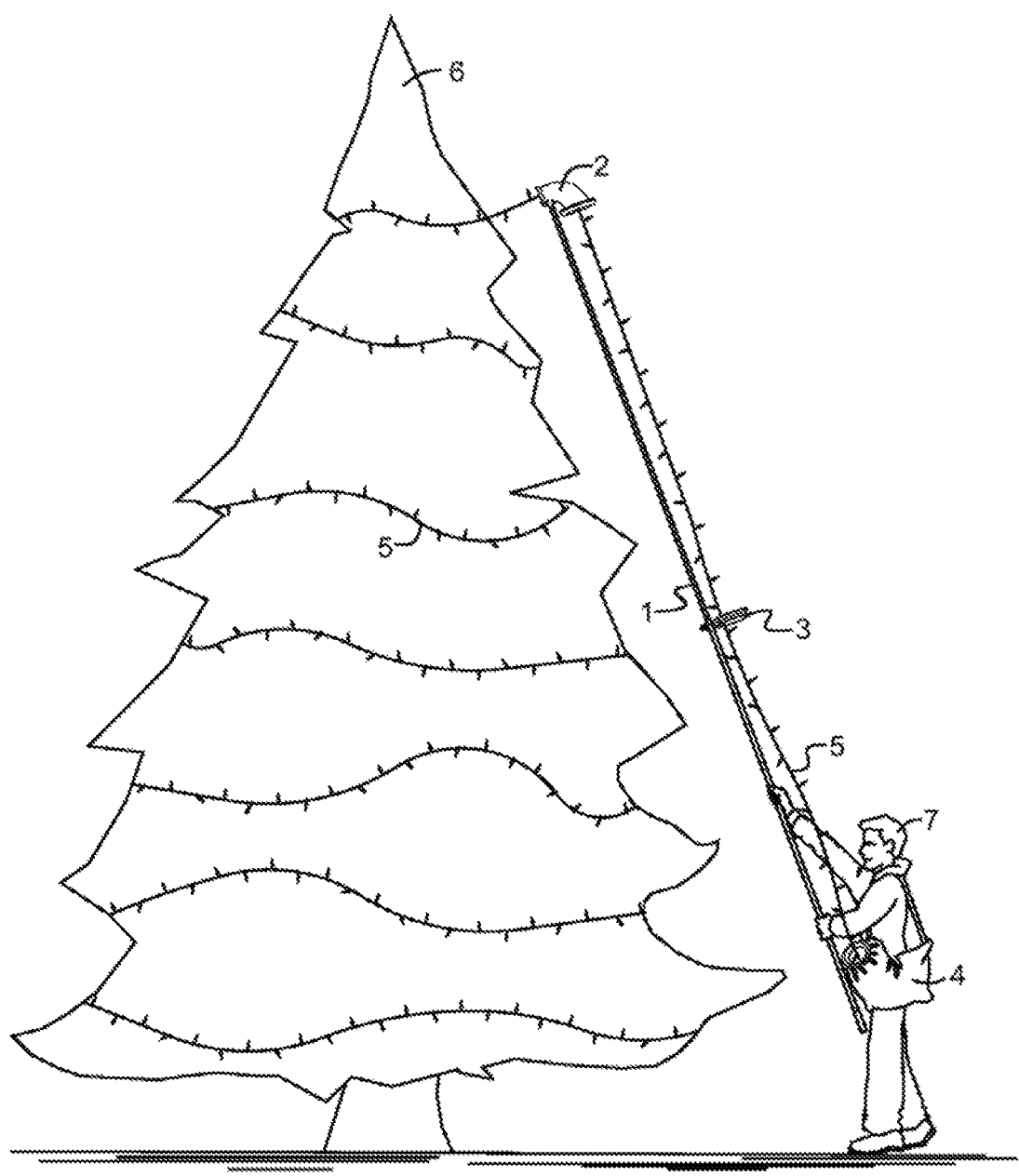
FIG. 1 is a perspective view of one of the examples of the present invention being used to install a continuous ornamental string, such as a string of lights on an evergreen tree.
Figure 2:
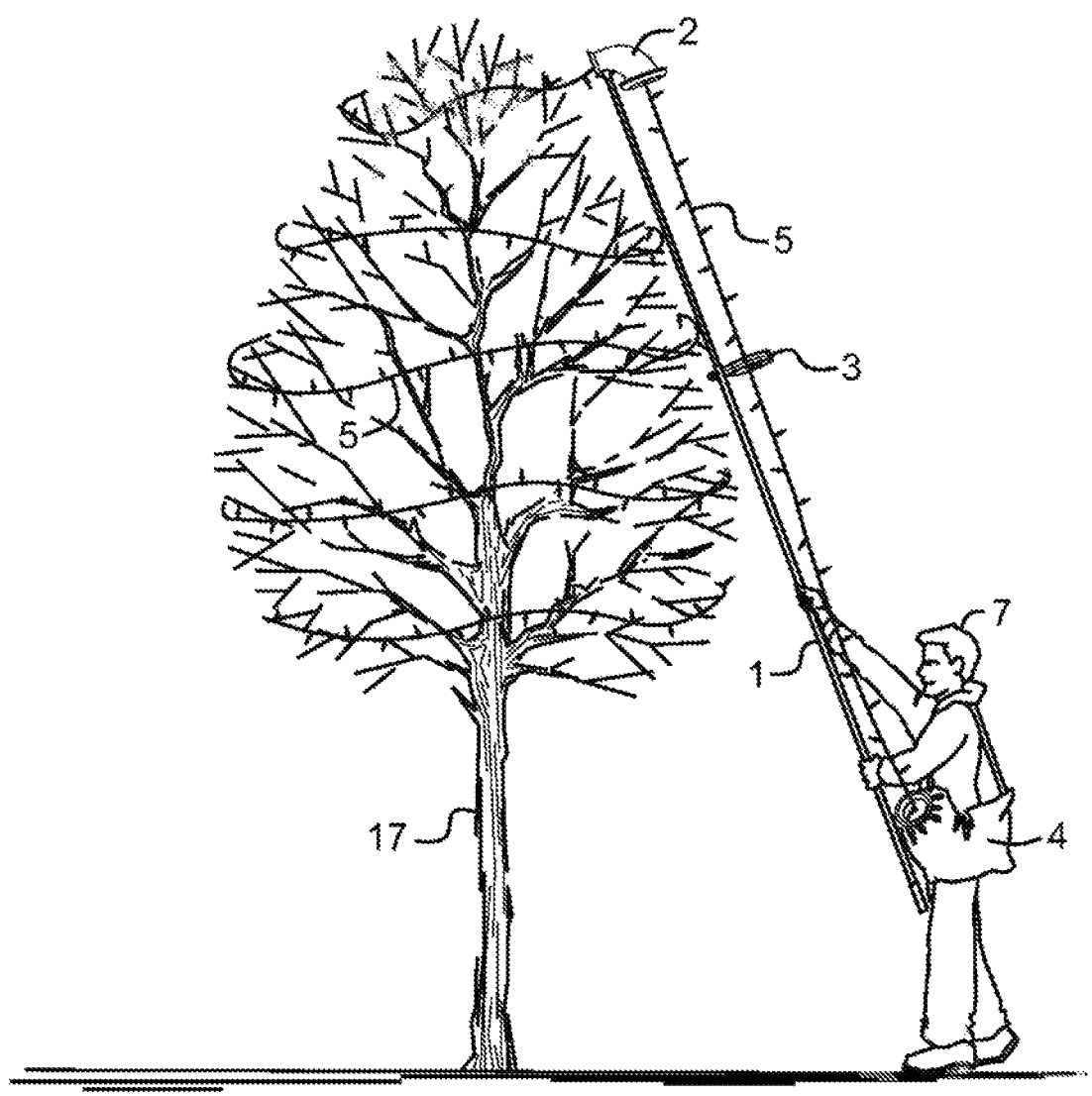
FIG. 2 is a perspective view of one of the examples of the present invention being used to install a continuous string of lights on a deciduous or ornamental tree.
Figure 3:
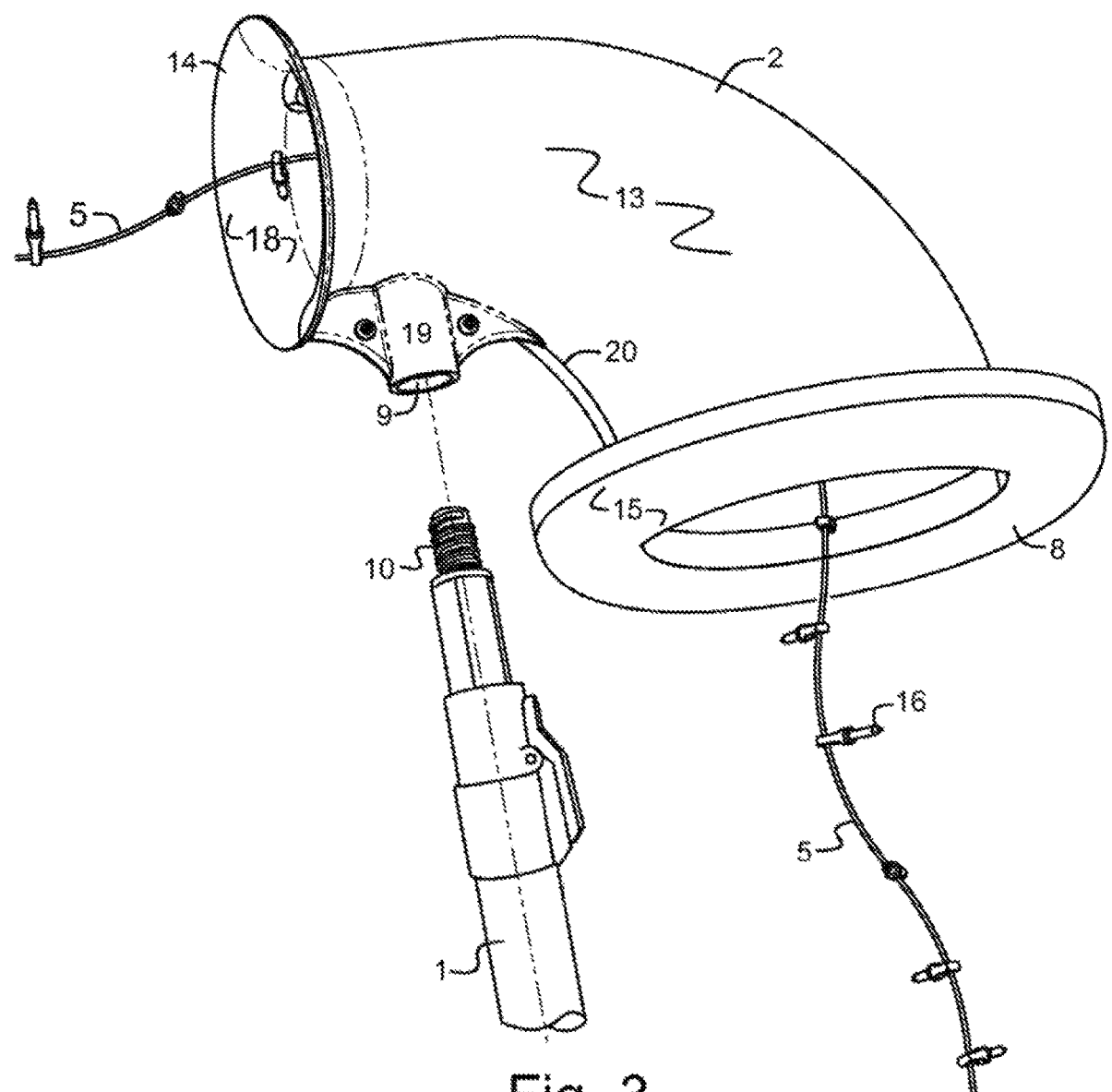
FIG. 3 is a perspective view of one example of the funnel-like device according to various embodiments described herein and a fragmented view of a typical extension pole.

Your attention is directed to the Figures, wherein like numerals indicate like or corresponding parts throughout the several views the devices. FIGS. 1 and 2 show a preferred embodiment of the current invention consisting of an extendable pole 1 with a tubular member here shows as a funnel-like device 2 attached to the end of extendable pole 1. The tubular member 2 includes a coupler having internal threads 9 for receiving external threads 10 of pole 1 (FIG. 3).

The tubular funnel like device 2 has a generally cylindrical plastic wall that includes an arcuate, approximately 90° bend. The device 2 includes an exterior surface and an interior surface that defines a hollow, light string receiving passageway.

A relatively larger diameter entry port having an entry flange 8 is disposed at the first end of the passageway, and a relatively smaller diameter exit port is disposed at the second end of the tubular member 2 passageway. An arcuately, radially outwardly opening bell-shaped exit flange 14 is disposed at the exit port. Also, a guide ring 3 is attached to extendable pole 1 at a position along the length of pole 1 at a position preferably above the area.

Figure 4:
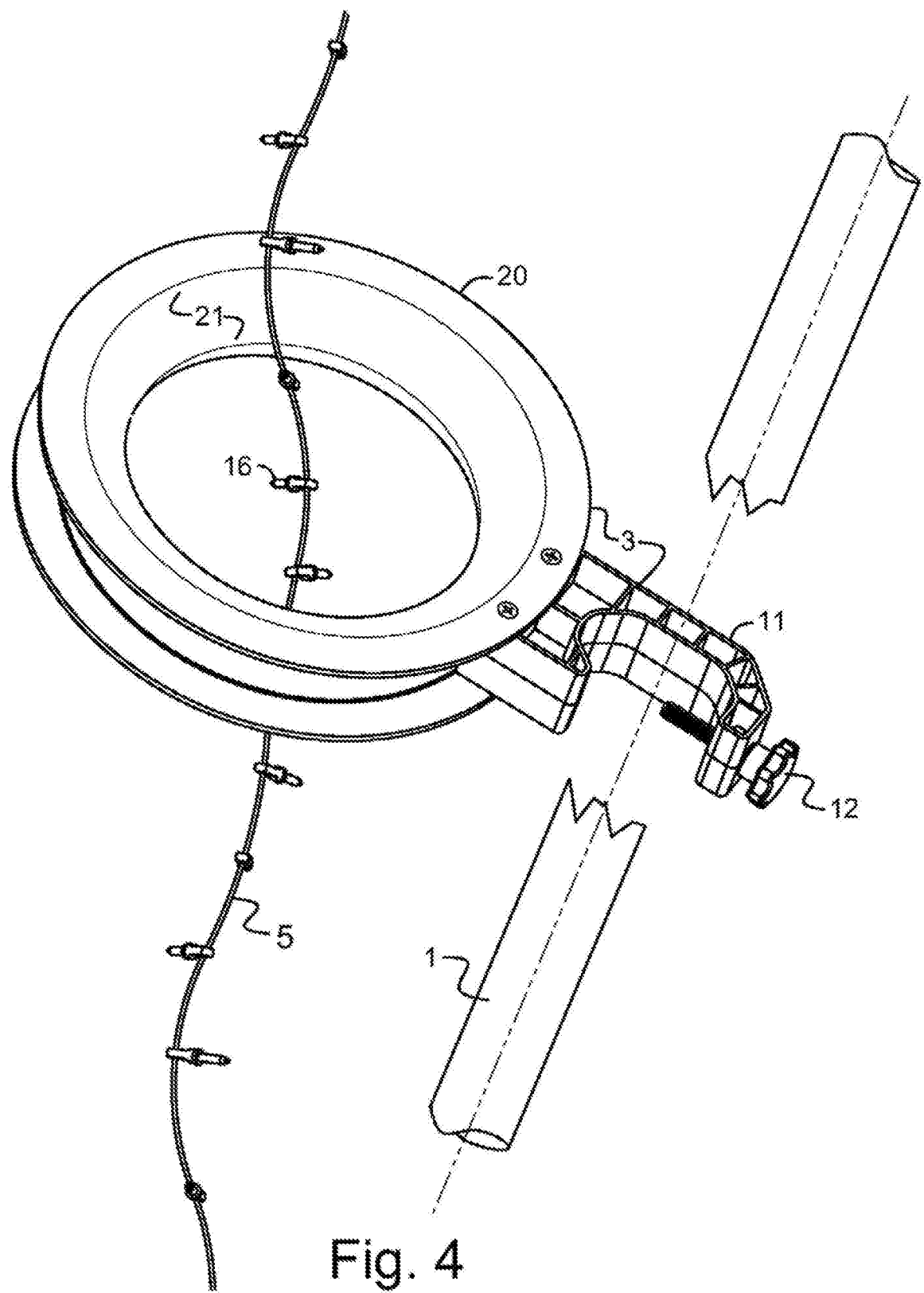
FIG. 4 is a perspective view of one example of the guide-ring device according to various embodiments described herein.

The guide ring 3 is connected to the pole with a "C" shaped clamp member 11 of the guide ring 3 assembly and threaded knob 12 (FIG. 4). The center of guide ring 3 is aligned with the center of the entry flange 8 of the tubular funnel device 2.

A fabric dispensing bag 4 is shown as being placed on the shoulder of user 7 through the area of a shoulder strap of the bag 4. The hollow interior of bag 4 is filled with a continuous string of lights 5 that are drawn through guide ring 3 and funnel 2 for placement or hanging on a physical object such as an evergreen tree 6 or deciduous tree 17 (FIG. 2).

FIG. 3 is an enlarged perspective view of the preferred embodiment of funnel-like device 2 and a fragmented view of extendable pole 1. The funnel shaped body 13 of the device 2 bends 90 degrees along smooth arcuate radius 20. The diameter of the passageway tapers from an inside diameter of about five (5) inches at the entry port flange 8 to a roughly three (3) inch inside diameter at exit port flange 14 at the exit port. Entry port flange 8 is disposed in a radially extending plane generally perpendicular to the axis of the passageway. Entry flange 8 has a one hundred-eighty (180) degree radius 15 to allow the continuous light string 5 to pass through with less friction and has no sharp edges that would catch or snag the individual bulbs 16 or other portions of light string 5.

Similarly, exit flange 14 has a smoothly arcuate, bell-shaped, approximately ninety (90) degree radius 18 at the opening that allows the light string 5 to pass through smoothly when exiting the passageway and placing or hanging the lights on tree 6 or tree 17. This configuration avoids catching of the individual bulbs 16 when pulling through in reverse for removal from tree 6 for example. The funnel device 2 has a cylindrical coupler 19 extending in a downward direction perpendicular to the plane of the entry flange 8. The coupler 19 has internal threads 9 for threadedly engaging matingly sized external threads 10 of extension pole 1.

FIG. 4 is an enlarged perspective view of the preferred embodiment of guide ring assembly 3. The assembly 3 consists of three parts including the annular ring 20, the "C" shaped clamp member 11 and the threaded knob 12 for engagement with the outermost section of extendable pole 1. The ring 20 has an inside diameter of preferably about five (5) inches to match the diameter of entry flange 8 of funnel device 2. The entry port and exit port of the ring 20 include radially extending flanges 20. Flanges 20 have a one hundred-eighty-degree (180) radius 21 to allow the continuous light string 5 to pass through with less friction. The ring 20 has no sharp interior edges to therefore avoid catching or snagging the individual bulbs 16 or other portion of light string 5.

The C-shaped clamp 11 includes an interior surface for receiving pole 1. The clamp 11 also includes a female threaded aperture for receiving the male threaded stud portion of threaded knob 12. The distal end of the knob 12 can be moved axially into a snugly fitting frictional engagement with the outer surface of the pole 1 to fixedly position the ring assembly 3 on the pole 1.

FIGS. 5, 5A, and 5B are an enlarged perspective views of the preferred embodiment of light dispensing bag 4 and of opening ring 24. Bag 4 is preferably made from a fabric such as canvas, nylon or similar fabric material and includes a shoulder strap 22 and a drawstring 23. The sphincter-like opening either ties or closes with barrel-lock or other mechanism.

An opening ring 24 is provided for insertion into the open end of bag 4 and secured by pulling drawstring 23 tight, closing the bag opening around the ring 24 and tying or securing the drawstring 23 with a barrel-lock or other mechanism. The ring 24 is pully shaped and includes radially outwardly extending flanges 24 at both the entry port and exit port.

The flange 24 form a radially outwardly opening annular perimetrical groove or channel 26 that is sized for receiving the sphincter like opening of the bag 4, to maintain the engagement between the bag 4 and the ring 24. By doing so, the ring 24 maintains the opening of the bag 4 at a desired diameter, wherein it is sized to be large enough to allow the free flow of lights out of and into the bag, while being small enough to prevent the lights from falling out of the bag 4.

The ring 24 has a one hundred-eighty-degree (180) radius 25 to allow the continuous string of lights 5 to move in and out of the mouth of the bag 4 smoothly. The continuous light string 5 consisting of one or several light strings joined together is inserted into the bag through ring 24 and simply allowed to coil or lay naturally in the bottom of the bag 4.

FIGS. 6 and 7 show an enlarged perspective view of the preferred embodiment of the flat "Y" shaped adjustment hook 27. The hook 27 includes an interiorly disposed, sheet-like planar flat section 33 that is surrounded by a perimetrally disposed continuous thicker perimeter band 34. The band 34 includes a slot 28 portion that opens axially distally at the distal end of the hook 27 in a vertical direction extending downward from the "Y". When hook 27 is attached to the external threads 10 of pole 1 and extended to light string 5 on a tree for adjusting along length or grabbing end plug 29, the slot 28 is positioned to internally receive the light string so that the position of the light string can be manipulated with the hook 27 and pole 1.

The slot is sized and configured to be generally smaller than the end plug 29 or individual bulb 16 so as to make it difficult for the plug 29 or a bulb 16 to slide through slot 28 in a direction perpendicular to the plane of hook 27. The relative size gives the user the ability to pull light string 5 in the desired direction for adjustment.

The hook 27 also has an axially proximally extending pointing section 30 that creates an upside down "V" shape and axially proximally opening hook portion 31. Hook portion 31 is used to pull light string 5 in a downward direction when adjusting on tree 6 or 17. Hook 27 also includes a cylindrical coupler 32 that includes internal threads 35 for threadedly receiving the external threads 10 of extension pole 1.

While the present invention has been described in terms of particular embodiments and applications, in both summarized and detailed forms, it is not intended that these descriptions in any way limit its scope to any such embodiments and applications, and it will be understood that many substitutions, changes and variations in the described embodiments, applications and details of the method and system illustrated herein and of their operation can be made by those skilled in the art without departing from the spirit of the present invention. Thereby, all such embodiments are contemplated and are intended to be covered by the following claims.

What is claimed is:

1. A string hanging device for hanging a continuous ornamental string on a physical object having a portion elevated above the upward reach of a user, the string hanging device comprising:
    a tubular member having an arcuately curved interior passageway configured for receiving the ornamental string, the passageway including an entry port and an exit port;
    a pole member having a proximal end and a distal end, and a coupler portion disposed at the distal end;
    a coupler for removably coupling the tubular member to the coupler portion of the distal end of the pole; and
    a hook member including a coupler for removably coupling the hook member to the coupler portion of the distal end of the pole.

2. The string hanging device of claim 1, wherein the entry port has a first diameter, and the exit port has a second diameter smaller than the entry port diameter, and wherein the passageway has a diameter that decreases between the entry port and the exit port to create a tunnel like passageway.

3. The string hanging device of claim 2, further comprising a first radially outwardly extending flange disposed at the entry port and a second radially outwardly extending flange disposed at the exit port.

4. The string hanging device of claim 1, further comprising a guide ring having an annular opening for interiorly receiving the ornamental string.

5. The string hanging device of claim 1, wherein the guide ring includes a clamp member for removably clamping the guide ring on to the pole, the clamp including a threaded knob having a distal end for engaging the pole to fixedly position the guide ring to the pole.

6. The string hanging device of claim 1, wherein the pole comprises a telescoping pole.

7. The string hanging device of claim 1, wherein the ornamental string comprises at least one of a light string, garland string, ornamental containing string, and electrical wire.

8. The string hanging device of claim 7, wherein the ornamental string comprises a plurality of serially coupled strings selected from the group consisting of light strings, garland strings, ornament containing strings and electrical wire.

9. The string hanging device of claim 1, wherein the physical object comprises at least one of a tree, pole, display, billboard, and building structure.

10. The string hanging device of claim 1, wherein the hook member includes a proximal end portion removably coupled to the pole and a distal portion, the distal portion including an axially distally opening first string receiving slot.

11. The string hanging device of claim 10, wherein the axially distally opening first string receiving slot is sized, positioned, and configured for enabling the user to engage the ornamental string to manipulate the string to change its position on the physical object.

12. The string hanging device of claim 11, wherein the axially distally opening first string receiving slot includes a width and a depth sized for receiving an ornamental light string.

13. The string hanging device of claim 12, wherein the axially distally opening first string receiving slot has a width of less than the length of a mini polka dot light or base.

14. The string hanging device of claim 13, wherein the width of the first string receiving slot is less than about 0.5 inches.

15. The string hanging device of claim 12, wherein the hook member further includes a proximal opening second string receiving slot.

16. The string hanging device of claim 15, further comprising a bag member for holding the ornamental string during the hanging of the string, the string hanging device including an opening sized for permitting the string to pass during the string hanging.

17. The string hanging device of claim 1, further comprising a bag member for holding the ornamental string during the hanging of the ornamental string, the string hanging device including an opening sized for permitting the string to pass during the string hanging.

18. The string hanging device of claim 1, wherein the bag includes an adjustably sized opening and an opening ring compatible with the adjustably sized opening and sized for permitting the passage of a light containing light string therethrough.

19. The string hanging device of claim 18, wherein the opening ring is generally pully shaped and includes a radially inwardly facing surface for defining the opening through which a light string can pass, and a pair of radially outwardly extending flanges for defining a channel for engaging a bag portion that defines the adjustably sized opening of the bag.

\* \* \* \* \*